United States Patent [19]

Farr

[11] Patent Number: 4,779,936
[45] Date of Patent: Oct. 25, 1988

[54] ANTI-LOCK BRAKING SYSTEMS FOR VEHICLES

[75] Inventor: Glyn P. R. Farr, Warwickshire, England

[73] Assignee: Lucas Industries public limited company, Great Britain

[21] Appl. No.: 118,281

[22] Filed: Nov. 6, 1987

[30] Foreign Application Priority Data

Nov. 15, 1986 [GB] United Kingdom ............... 8627378

[51] Int. Cl.$^4$ ............................. B60T 8/40; B60T 8/44
[52] U.S. Cl. ...................................... 303/116; 303/92; 303/115
[58] Field of Search ............ 188/181 A; 303/92, 110, 303/114, 115, 116, 119

[56] References Cited

U.S. PATENT DOCUMENTS

| 4,477,125 | 10/1984 | Belart et al. | 303/116 |
| 4,480,877 | 11/1984 | Resch | 303/116 |
| 4,568,131 | 2/1986 | Blomberg et al. | 303/115 |

Primary Examiner—Duane A. Reger
Attorney, Agent, or Firm—Laff, Whitesel, Conte & Saret

[57] ABSTRACT

A vehicle anti-lock braking system is disclosed in which a supply of fluid from a master cylinder is modulated in accordance with signals from wheel speed sensors to affect brake release and re-application during an anti-lock mode. An electric motor drives a first pump to provide a source of power during the anti-lock mode, and a second pump to charge a hydraulic acumulator. The pressure stored in the accumulator may be used to provide assistance when applying the brakes, and may also be used to apply a portion of the braking system.

10 Claims, 4 Drawing Sheets

ANTI-LOCK BRAKING SYSTEMS FOR VEHICLES

This invention relates to vehicle anti-lock braking systems of the kind in which a supply of operating fluid from a supply, suitably a master cylinder, to a vehicle brake is modulated in accordance with signals from speed sensing means to affect automatic brake release and re-application during an anti-lock control mode, and an hydraulic pump driven by an electric motor provides a source of power during the anti-lock mode.

In one known braking system of the kind set forth, the electric motor driven pump is used to charge an accumulator with pressurised fluid. The pressurised fluid is subsequently used either to force a release of pressure from the brake, or to provide re-application of pressure to the brake, either directly or indirectly. In addition the accumulator may be used to provide assistance to apply the brake.

In such a known system, failure of the accumulator also renders the anti-lock control mode inoperative.

In another known braking system of the kind set forth, the electric motor driven pump is used to replenish brake fluid released from the brake to an expansion chamber during the anti-lock control mode, and a separate power source, for example vacuum or power steering fluid, is utilized to control the brake applying or re-applying pressure.

In such a known system therefore, a separate, additional, power source is required to provide assistance when applying the brake.

According to my invention, in a vehicle anti-lock braking system of the kind set forth the electric motor is adapted to drive both a first pump to replenish brake fluid released from the brake to an expansion chamber during the anti-lock control mode, and a second pump to charge an hydraulic accumulator.

The pressure stored in the accumulator may be used to provide assistance when applying the brake and may also be used to apply a portion of the braking system.

This has the advantage that the anti-lock control mode is still operative should the accumulator fail, and that a separate power source, for example vacuum or power steering fluid, is not required to provide assistance when applying the brake.

Conveniently each pump comprises a piston working in a bore, and the electric motor is adapted to drive two pistons, each working in a respective bore. In such a construction, one piston is adapted to replenish fluid released during the anti-lock control mode, and the other piston is adapted to pressurise the accumulator.

In a preferred construction the electric motor is adapted to drive a pair of opposed pistons and a third piston, the two opposed pistons each acting to replenish released fluid from different braking circuits of the system during respective anti-lock control modes, and the third piston is adapted to pressurise the accumulator.

In such a preferred construction the accumulator may be utilised to provide pedal assistance during braking and, in a modification, may additionally be used to apply the brakes in an independent braking circuit, suitable the brakes on the rear wheels on a vehicle.

Some embodiments of our invention are illustrated in the accompanying drawings in which.

Figure 1:
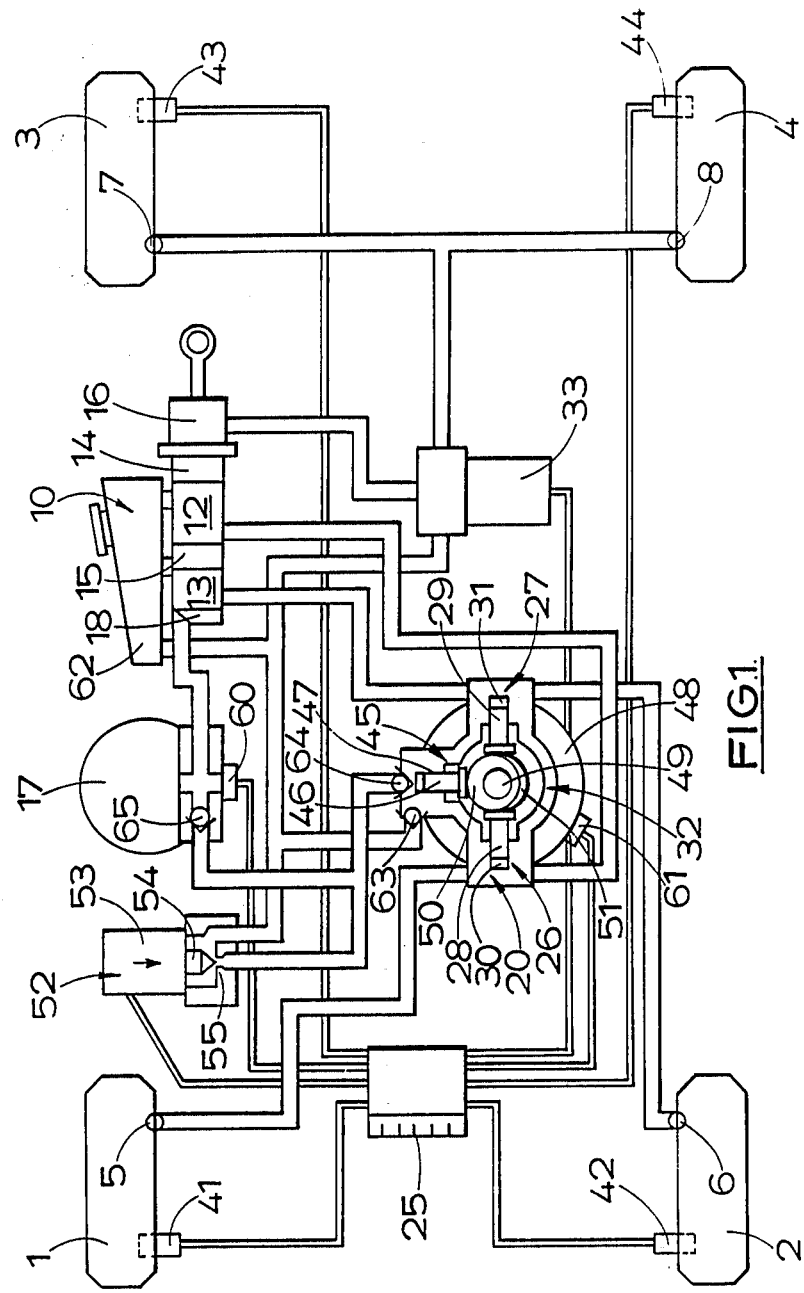
FIG. 1 is a layout anti-lock braking system.

In the hydraulic system illustrated in FIG. 1 of the accompanying drawings front wheels 1, 2 of a vehicle are provided with brakes 5, 6 respectively, and rear wheels 3, 4 with brakes 7, 8 respectively.

A combined hydraulic booster and tandem master cylinder assembly 10 operates the brakes. The assembly need not be described in detail since it forms the subject of our co-pending Patent Application No. 8626425 dated Nov. 5, 1986. The assembly is operable by a pedal for normal service braking in order to apply the two front brakes 5, 6 separately from different pressure spaces 12, 13 in front of its pistons 14 and 15 respectively, and both rear wheel brakes 7 and 8 from a third booster space 16.

To operate the booster by pressurisation of the booster space 16, hydraulic fluid under pressure is supplied to it through an internal passage from an hydraulic accumulator under the control of a spool valve 18. The spool valve 18 is housed in the end of the assembly 10 remote from the pedal, and is operated by a relatively small movement of the pistons 14, 15 which react with a third piston (not shown) to co-operate with the spool valve itself.

The supply of fluid to the front wheel brakes 5 and 6 is modulated by a modulator assembly 20 of the solenoid-operated dump and pump to re-apply type which is adapted to control operation of the two brakes 5 and 6 independently of each other in response to energising current from an electronic control module 25.

The modulator assembly may conveniently form the subject of our G.B. Patent Application No. 8512610 (EP-A-No. 0202845) and need not be further described herein except to explain that the fluid released from each brake 5, 6 through a flow-control valve is adapted to be replenished by means of a separate pump 26, 27 respectively, each pump comprising a piston 28, 29 working in a separate bore 30, 31 in a common housing 32.

Supply of fluid to both rear wheel brakes 7 and 8 is modulated by a solenoid-operated modulator assembly 33. The modulator assembly 33 is similar in construction to the assembly 20 but includes only one solenoid-operated valve, and a pump to recover the fluid released from a brake is omitted.

Each wheel 1, 2, 3, 4 is provided with a respective speed sensor 41, 42, 43, and 44, and electrical signals from the sensors are fed into the electronic control module 25 which, depending on the nature and duration of any signal, may emit an energising current.

When the brakes 5, 6, 7 and 8 are to be applied for normal service operation to effect retardation of the vehicle, the pedal acts to advance a boost piston in the booster space 16. This action operates the spool valve 18, and high pressure fluid from the accumulator 17 supplied to the booster space 16 acts to advance the boost piston in the space 16 in order to augment the force from the pedal. Pressurised fluid is supplied simultaneously from both pressure spaces 12 and 13 to the brakes 5 and 6 of the front wheels 1 and 2, and from the booster space 16, or the accumulator 17 under the control of the spool valve 18, to the rear wheel brakes 7 and 8.

The behaviour of the braked front wheels 1, 2, and both rear wheels 3, 4, are controlled by the modulator assemblies 20 and 33 in a known manner in response to energising currents from the control module 25 which, in turn, depend upon the signals from the speed sensors 41, 42, 43 and 44.

In the event of the pressure applied to either brake 5 or 6 being relieved through the flow-control valve to correct a skid condition, fluid from the respective brake 5, 6 is replenished automatically by the pump 26, 27 incorporated in the modulator assembly 20. However, the automatic re-application of the brakes 7 and 8 at the termination of a skid signal is achieved by the presence of high pressure in the accumulator 17.

The hydraulic accumulator 17 is charged with pressurised hydraulic fluid by means of a pump 45. As illustrated the pump 45 comprises of piston 46 working in a bore 47 in the housing 32, and the bore is displaced by 90° from the two bores 30 and 31 which are diametrically opposed.

The three pumps 26, 27 and 45 are driven by a common electric motor 48, and the motor 48 is sufficiently powerful to cater for the torque required to operate all three pistons 28, 29 and 46. Specifically the electric motor 48 has a driven shaft 49 which extends axially through the housing 32. The driven shaft 49 is provided with two eccentric cams 50, 51 arranged in side-by-side axially spaced relationship on the shaft 49. The cam 50 is common to, and provides a drive mechanism for, the pistons 28, 29 of the pumps 26 and 27, and the cam 51 provides a drive mechanism for the pump 45.

Pressurisation of the accumulator 17 by the pump 45 is controlled by a solenoid-operated valve 52 comprising a solenoid 53 which, when energised, is operative to urge a head 54 into engagement with the seating 55 to close the valve 52. Normally the valve 52 is open with the head 54 held away from the seating 55 by means of a spring (not shown).

An electrical pressure switch 60 responsive to pressure in the accumulator 17 is connected to the control module 25, and the control module 25 is also connected to an electric switch 61 for controlling operation of the electric motor 48.

Should the pressure in the accumulator 17 fall below a certain value, the pressure switch 60 sends an appropriate signal to the control module 25. The control module 25 then emits a corresponding electric current which operates the switch 61 to start the electric motor 48. It also energises the solenoid 53 to urge the head 54 into engagement with the seating 55 thereby to isolate a return line to a reservoir 62 for fluid, suitably the reservoir for the assemlby 10. This action causes the piston 46 to reciprocate in its bore 47 and charge the accumulator 17 with pressurised fluid. Specifically the piston 46 withdraws fluid from the reservoir 62 through a one-way inlet valve 63 and pumps it to the accumulator 17 through a one-way outlet valve 64 in the pump and a one-way inlet valve 65 in the accumulator 17. During this operation the pistons 28 and 29 reciprocate in their respective bores 30, 31 but as respective expander chambers associated with the pistons 28 and 29 (not illustrated) are not charged with fluid, the pistons 28 and 29 are not effective and no fluid is displaced in separate brake circuits from the pressure spaces 12 and 13 to, and including, the respective brakes 5 and 6.

When the accumulator 17 is fully charged, the pressure switch 60 changes its signal to the control module 25 and energising current to the motor 48 and to the solenoid 53 from the control module 25 is turned off.

Should a potential skid condition be sensed at either or each front wheel 1, 2 by either or each sensor 41, 42, when the accumulator is fully charged the pressure applied to the brake 5, 6 is relieved to the respective expander chamber in the modulator assembly 20 by a respective solenoid-operated valve operated by a corresponding current from the control module 25, and a current from the module 25 also operates the switch 61 to start the motor 48 in order to replenish fluid displaced from the or each brake 5, 6. In this condition one or both of the opposed pistons 28, 29 are active, but the remaining piston 46 simply circulates fluid from and back to the reservoir 62 in a closed circuit through the one-way valves 63 and 64, and the solenoid-operated valve 52 which is open Should the accumulator 17 require charging while the brakes 5 and 6 on the front wheels 1, 2 are being controlled by the modulator assembly 20, the solenoid-operated valve 52 again closes in respose to current from the control module 25 which corresponds to a signal from the pressure switch 60. The pump 45 then becomes operative to charge the accumulator 17 with pressurised fluid as described above.

If a skid condition is sensed by either of the sensors 43 and 44 for the rear wheels 3, 4, a solenoid-operated valve in the modulator 33 is actuated by the control module 25 in response to a signal from the respective sensor 43 or 44 and opens to relieve to the reservoir 62 the pressure applied to both rear wheel brakes 7, 8. Upon recovery of the wheel speed, the signal from the sensor is cancelled and the solenoid-operated valve in the modulator 33 closes. The rear wheel brakes 7 and 8 are then re-applied from the accumulator 17 through the booster space 16.

Should the accumulator 17 require charging to re-apply the brakes 7 and 8 then this takes place as described above, with the solenoid-operated valve 52 closing in response to a signal from the pressure switch 60.

If the accumulator 17 fails, booster assistance for the driver and brake-applying pressure for the rear wheel brakes 7, 8 also fails. The driver can, however, still apply both front wheel brakes 5, 6 with substantially little travel loss, and the modulator assembly 20 will still be operable to provide anti-lock control for the front wheels 1, 2.

A warning light is provided to provide a signal to the driver of a reduction in pressure in the accumulator 17, or failure of the anti-lock modulator assembly 20.

Figure 2:
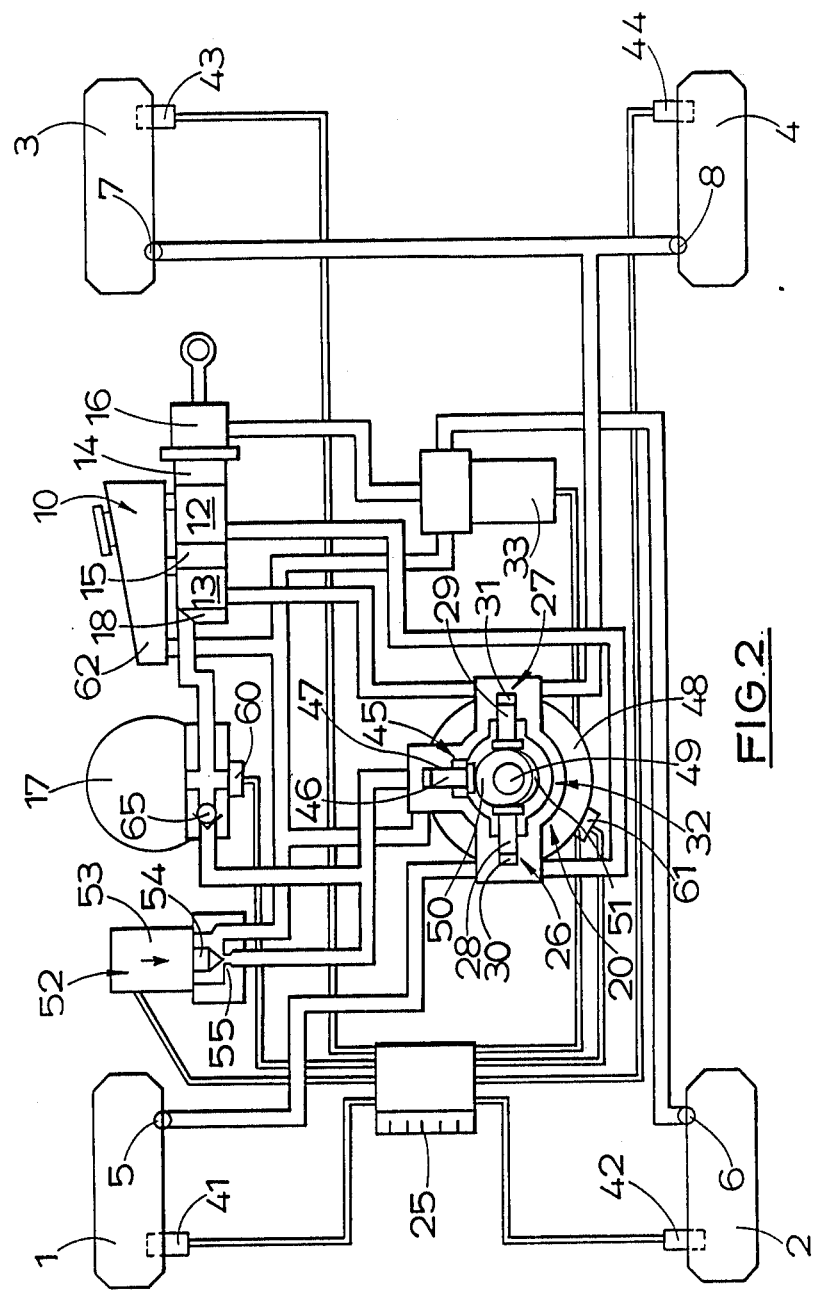
FIG. 2 is a layout similar to FIG. 1 but showing a modified system.

The braking system illustrated in the layout of FIG. 2 of the drawings is similar to FIG. 1 except that the pressure from the booster space 16 is fed to the front wheel brakes 6, and the brakes 7, 8 on the rear wheels 3 and 4 are operated by the pressure space 13 in the master cylinder through the modulator assembly 20. The modulator assembly 20, as before, also modulates the supply of fluid from the pressure space 12 to the other front wheel brake 5.

The construction and operation of the braking system of FIG. 2 is otherwise the same as that of FIG. 1 and corresponding reference numerals have been applied to corresponding parts.

Figure 3:
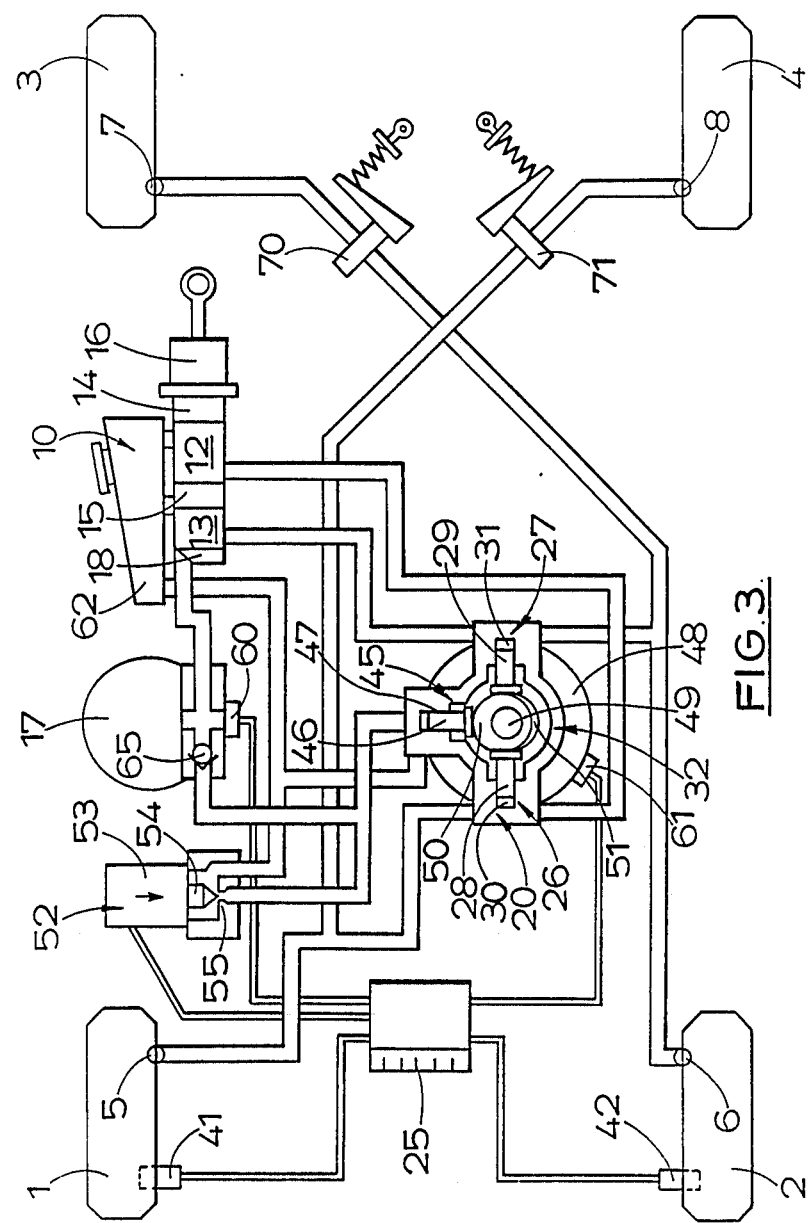
FIG. 3 is a layout similar to FIG. 1 but showing a further modified system.

The braking system illustrated in the layout of FIG. 3 of the accompanying drawings is again similar to the layout of FIG. 1. The connections between the booster space 16 and the rear wheel brakes 7, 8, and between the accumulator 17 and the modulator assembly 33, the modulator assembly 33 itself, and the rear wheel sensors 43 and 44 are all omitted. The rear wheel brakes 7, 8 are each connected to the respective diagonally opposite front wheel brake 6 and 5 on the downstream side of the modulator assembly 20 through respective brake apportioning valves 70 and 71 of known construction.

The behaviour of a rear wheel brake 7, 8 is therefore dictated by the behaviour of the brake on the diagonally opposite front wheel 2, 1, duly modified by the presence of the respective apportioning valve 70, 71.

The system uses hydraulic power from the accumulator 17 to power the assembly 10 as before.

The layout of FIG. 3 is particularly suitable for small family cars powered by engines of the compression-ignition type. In such vehicles a vacuum pump and a pneumatic brake servo would otherwise have to be fitted, because vacuum power from such an engine is normally insufficient to energise a pneumatically-operable booster.

The braking system of FIG. 3 is otherwise the same as that of FIG. 1, and corresponding reference numerals have again been applied to corresponding parts.

Figure 4:
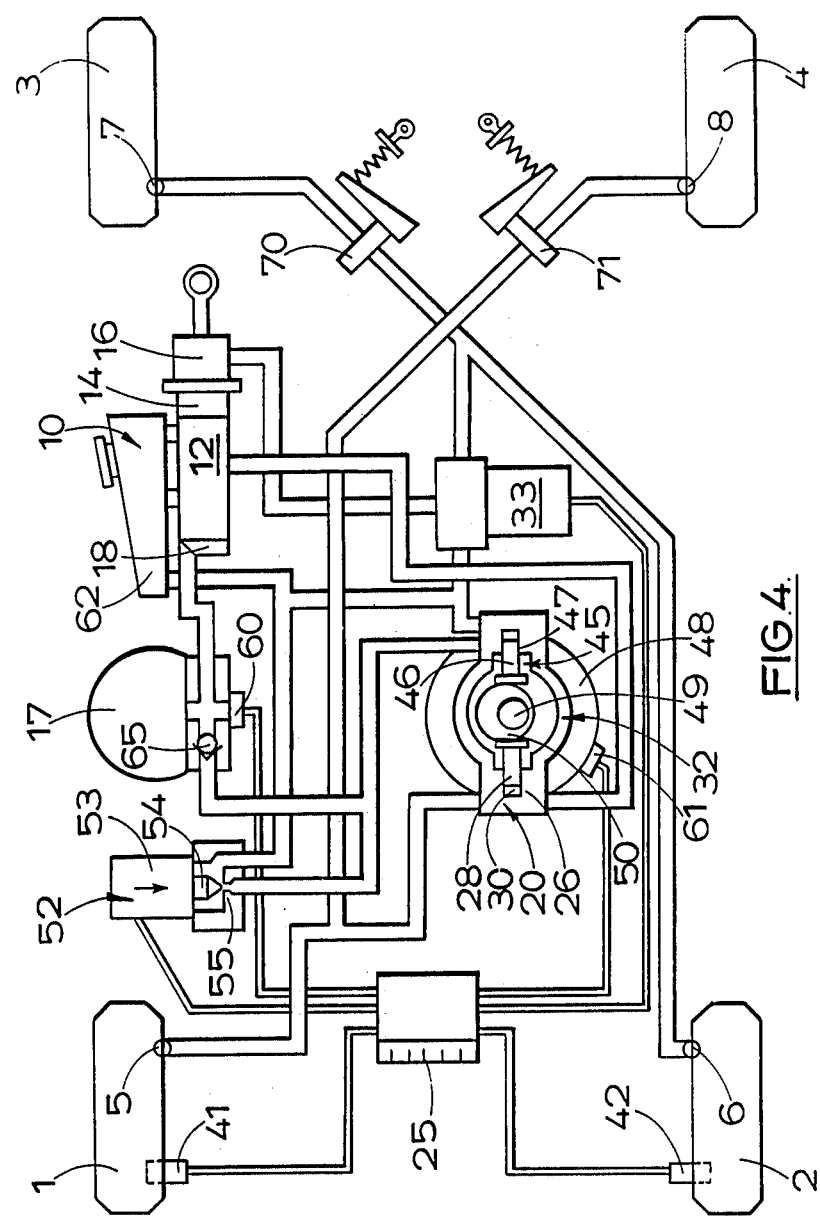
FIG. 4 is another layout similar to FIG. 1 but showing yet a further modification.

The braking system shown in the layout of FIG. 4 of the accompanying drawings is also similar to the braking system shown in the layout of FIG. 1. In the layout of FIG. 4, however, the master cylinder has only a single pressure space 12, and the pump 27 and its corresponding dump chamber are omitted from the modulator assembly. The rear wheels sensors 43 and 44 are also omitted. In a similar manner to the layout of FIG. 3, the rear wheel brakes 7, 8 are each connected to the diagonally opposite front wheel brakes 6 and 5 through the apportioning valves 70, 71. In the layout of FIG. 4, however, the brakes 5 and 8 applied from the pressure space 12 are both modulated by the modulator assembly 20, whereas the brakes 6 and 7 applied from the booster space 16 are both modulated by the modulator assembly 33.

In the construction of FIG. 4 the pistons 28 and 46 are arranged diametrically opposite each other and are both operated by the cam 50, the cam 51 being omitted.

The construction and operation of the system of FIG. 4 is otherwise the sames as that of FIG. 1 and corresponding references have again been applied to corresponding parts.

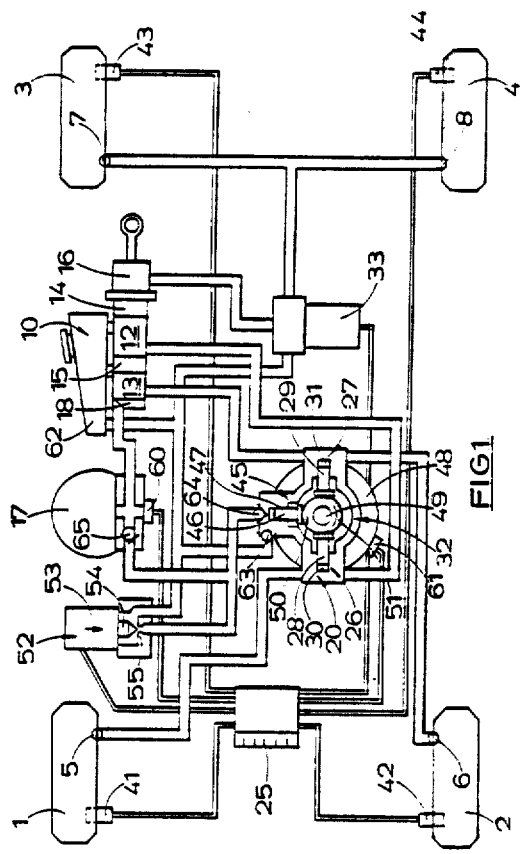

What I claim is:

1. An anti-lock braking system for a vehicle having a wheel braked by a brake, said system comprising speed sensing means for sensing the rotational speed of the wheel and for emitting signals, a supply of operating fluid for applying said brake, modulator means for modulating said supply of operating fluid to said brake in accordance with said signals from said sensing means to affect release and re-application of said brake during an anti-lock control mode, means defining an expansion chamber to which brake fluid is released from said brake during said anti-lock control mode, an hydraulic accumulator, a first pump to replenish brake fluid released from said brake during said anti-lock control mode, a second pump to charge said hydraulic accumulator, and an electric motor to drive both said first pump and said second pump.

2. A braking system according to claim 1, wherein pressure stored in said accumulator provides assistance when applying said brake.

3. A braking system according to claim 1, wherein pressure stored in said accumulator is used to apply a portion of said braking system.

4. A braking system according claim 1, wherein each pump comprises a piston working in a bore, and said electric motor is adapted to drive at least two pistons, each working in a respective bore.

5. A braking system according to claim 4, wherein said electric motor is adapted to drive two pistons, one of said pistons being adapted to replenish fluid released during said anti-lock control mode, and the other said pistons being adapted to pressurise said accumulator.

6. A braking system according to claim 5, wherein said two pistons are diametrically opposed, and said bores are provided in a common housing.

7. A braking system according to claim 4, wherein said electric motor is adapted to drive a pair of opposed pistons, and a third piston.

8. A braking system according to claim 7, including first and second different braking circuits, wherein said two opposed pistons each act to replenish fluid from said different braking circuits during respective anti-lock modes, and said third piston is adapted to pressurise said accumulator.

9. A braking system according to claim 1, wherein said source comprises a pedal-operated master cylinder, and wherein said accumulator is utilised to provide assistance to said pedal during braking.

10. A braking system according to claim 1, wherein said accumulator is used to apply said brakes in an independent braking circuit.

* * * * *

UNITED STATES PATENT AND TRADEMARK OFFICE
CERTIFICATE OF CORRECTION

PATENT NO. : 4,779,936

DATED : Oct. 25, 1988

INVENTOR(S) : Glyn P. R. Farr

It is certified that error appears in the above-identified patent and that said Letters Patent is hereby corrected as shown below:

The Title Page consisting of the Illustrative Figure should be deleted to appear as per attached sheet.

Signed and Sealed this

Twenty-first Day of March, 1989

*Attest:*

DONALD J. QUIGG

*Attesting Officer*  *Commissioner of Patents and Trademarks*

United States Patent [19]

Farr

[11] Patent Number: 4,779,936
[45] Date of Patent: Oct. 25, 1988

[54] ANTI-LOCK BRAKING SYSTEMS FOR VEHICLES

[75] Inventor: Glyn P. R. Farr, Warwickshire, England

[73] Assignee: Lucas Industries public limited company, Great Britain

[21] Appl. No.: 118,281

[22] Filed: Nov. 6, 1987

[30] Foreign Application Priority Data

Nov. 15, 1986 [GB] United Kingdom ............ 8627378

[51] Int. Cl.⁴ .................... B60T 8/40; B60T 8/44
[52] U.S. Cl. .................... 303/116; 303/92; 303/115
[58] Field of Search ........... 188/181 A; 303/92, 110, 303/114, 115, 116, 119

[56] References Cited

U.S. PATENT DOCUMENTS

| 4,477,125 | 10/1984 | Belart et al. | 303/116 |
| 4,480,877 | 11/1984 | Resch | 303/116 |
| 4,568,131 | 2/1986 | Blomberg et al. | 303/115 |

Primary Examiner—Duane A. Reger
Attorney, Agent, or Firm—Laff, Whitesel, Conte & Saret

[57] ABSTRACT

A vehicle anti-lock braking system is disclosed in which a supply of fluid from a master cylinder is modulated in accordance with signals from wheel speed sensors to affect brake release and re-application during an anti-lock mode. An electric motor drives a first pump to provide a source of power during the anti-lock mode, and a second pump to charge a hydraulic acumulator. The pressure stored in the accumulator may be used to provide assistance when applying the brakes, and may also be used to apply a portion of the braking system.

10 Claims, 4 Drawing Sheets